(No Model.)
J. HUGHES.
APPARATUS FOR CONCENTRATING ACIDS.
No. 339,552. Patented Apr. 6, 1886.
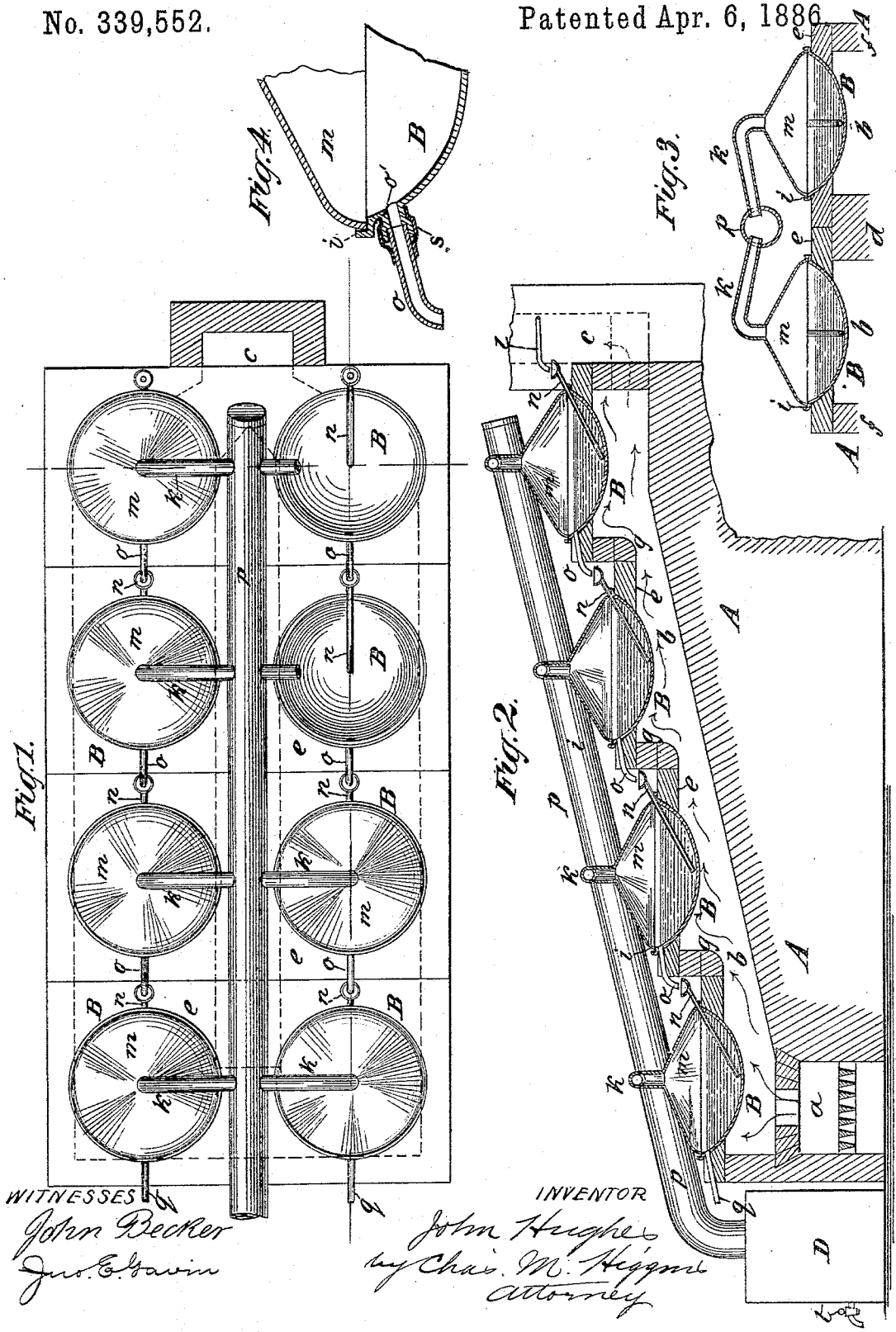
WITNESSES
John Becker
Jno. E. Gavin
INVENTOR
John Hughes
by Chas. M. Higgins
Attorney

UNITED STATES PATENT OFFICE.

JOHN HUGHES, OF STAPLETON, NEW YORK.

APPARATUS FOR CONCENTRATING ACIDS.

SPECIFICATION forming part of Letters Patent No. 339,552, dated April 6, 1886.

Application filed August 6, 1885. Serial No. 173,709. (No model.)

*To all whom it may concern:*

Be it known that I, JOHN HUGHES, a citizen of the United States, residing at Stapleton, Richmond county, New York, have invented an Improved Apparatus for Concentrating Acids, of which the following is a specification.

My apparatus is more especially designed for concentrating sulphuric and nitric acids, but may be employed for concentrating or evaporating any other chemical for which it may be found adapted.

My invention relates to that class of apparatus which employ a series of evaporating-pans arranged one above the other in terraces or steps and set in a furnace or fire-place, and so related or equipped that the liquid flows successively from pan to pan, the weak liquid entering the first or highest pan, which in thence flowing from one to the other becomes more and more concentrated, until it issues from the last or lowest pan in a highly-concentrated state, the said last pan being arranged over the hottest part of the fire, while the other pans are at remoter distances from the fire, according to the order of their succession, so that the pans become more and more heated, according to the density of their contents. Such an apparatus is shown in a former patent issued to me May 28, 1867, No. 65,227, on which my present invention is an important improvement.

In my former patent I employed a series of flat pans placed upon a bed of sand supported upon continuous plates over the furnace, said pans being open at the top, but inclosed in a common arch or chamber above the furnace, from which a pipe was led to conduct off the vapor or gases rising from the pans.

Now, in my present improvement I make the evaporating-pans of fine thin porcelain, preferably of a rounded or spherical saucer shape, and they are set in an opening in a tile mounted over the furnace-chamber, so that the heat is applied directly against the pan, the whole base of which is suspended and exposed in the flue or fire-chamber of the furnace. Each pan is made with a lipped or rimmed margin, and is covered by a cap made of transparent glass, whose lower edge sets tightly in the lipped rim of the pan, and through this glass cap the evaporating action of the pan can be readily observed. This glass cap is connected at the top by a tube with a pipe leading to a condensing-chamber, so that all the pans are thus closed on the top, yet freely exposed in the air, while their vapors or fumes are conducted safely off to be condensed. The liquid, in being fed into the pans or from one pan to the other, flows into a funnel-tube, which enters the edge of the pan at or near its joint with the cap, and extends to the center and bottom of the pan, whereby the weaker liquid is delivered directly at the bottom of the pan, and serves to maintain an efficient movement or circulation in the pan.

My present invention therefore consists, mainly, in the features above outlined, as hereinafter fully set forth and claimed.

In the drawings annexed, Figure 1 presents a plan view of my improved concentrating apparatus. Fig. 2 is a longitudinal section thereof, and Fig. 3 is a cross-section. Fig. 4 is an enlarged fragmentary view of one of the covered pans.

In the drawings I have shown my apparatus as consisting of two rows of evaporating-pans, with four pans in each row, the pans of each row being connected together, so as to deliver from one to the other from the first to the last, so that two separate streams of acid will be delivered from the two rows of pans. I do not, however, limit myself to any special number or order of grouping of the pans; but I have found the described grouping convenient and desirable.

Referring to the drawings, A indicates the furnace, which is preferably made of brickwork, and is erected on a suitable foundation within a shed or housing.

*a* indicates the fire-chamber of the furnace, which is double or extends transversely in one end of the furnace, so as to underlie the two last pans of the series, and from this fire-chamber two flues, *b b*, pass on an upward inclination and enter the chimney or uptake *c*, said flues being separated by a brick or tile partition-wall, *d*.

Now, B B indicate the evaporating-pans, which are mounted in two rows in the top of the furnace over the fire-place *a* and the flues *b b*, and in terraces or steps one above the other, as shown. The pans are supported on large tiles or fire-proof plates *e e*, which are set like steps one over the other on the top of the furnace over the flues $b\ b$, said tiles $e$ being supported on the side walls, $f\ f$, of the furnace and on the middle partition-wall $d$, as seen in Fig. 3, and also on the risers $g\ g$, which cross the top of the furnace at each step or terrace, as shown best in Fig. 2. The risers $g\ g$ are made of brick, tile, or stone, and serve, as will be seen, to support the front edge of the tiles $e\ e$, while the back edges of the tiles abut against the next riser, which risers also close the vertical space between any two succeeding tiles, as shown in Fig. 2. The tiles $e\ e$ are made with a round partly-flaring opening, as best shown in Figs. 2 and 3, large enough to admit the upper part of the evaporating-pan, which thus sets into said opening, and is thus supported by and socketed in the tile, so that the upper edge or rim of the pan is flush, or nearly so, with the top of the tile, while the bottom and greater portion of the pan projects down into the flue or fire-chamber of the furnace to receive the action of the heat directly thereagainst.

The pans are preferably sixteen inches in diameter and five inches deep, and are made of fine pure porcelain free from iron. The outer and lower portion of the pan, which projects into the furnace, and is exposed to the heat, is preferably left unglazed, while the upper outer edge is glazed, as is also the entire inner surface of the pan.

Each pan is made with an upturned or ledged rim, $i$, as seen best in Figs. 2 and 3, into which the lower edge of an inverted funnel-shaped glass cover, $m$, sets, so as to cover the pan fume-tight and prevent the escape of vapors or fumes from the pan into the shed or apartment where the apparatus is working.

The weak acid is fed to the concentrating apparatus through a spout, $l$, as seen in Fig. 2, from the feeding-pan, usually made of lead and heated by the waste gases from the furnace A, said feeding-pan not being shown in the drawings, as it is presumed to be of the ordinary character. The acid from the feeding-pan is usually at a density of 60° Baumé, and it is allowed to trickle from the spout $l$ at the proper regulated rate into the first pan, the feed from the spout being first received into a funnel-tube, $n$, which passes through a close-fitting notch at the joint between the pan B and its cap $m$, and thence extends to the bottom and center of the pan, as shown in Fig. 2. As the weak acid accumulates in the pan and becomes heated and evaporated, it thus acquires a greater density, and finally overflows or flows out by a delivery-spout, $o$, into the next pan, the said delivery-spout $o$ discharging into a funnel-tube, $n$, which extends to the bottom of the next pan in the same manner as the first. In this second pan the acid acquires a still higher density, and finally flows out into the next pan in the same manner, and so proceeds to the last pan in the series, where it acquires its final density, usually 66°, and from whence it flows through the final spout, $q$, into a cooler, and thence into a reservoir or cistern, in the usual manner. In this way the heat is applied in a gradually-increasing manner to the liquid as it becomes denser, as the pan holding the most dense acid is over the hottest part of the fire, while the pan having the weak acid is farthest from the fire, and in this way the concentration is performed rapidly and safely without having a large quantity of liquid in any one pan at a time.

It will be seen that each funnel-tube $n$ has a small bowl or funnel at its receiving end, into which the liquid is fed, and from the base of which the funnel-tube proceeds at an angle of forty-five degrees, or thereabout. This funnel-tube is preferably made of glass or porcelain in one piece, as shown. The outflow-spouts $o$ are also made of glass or porcelain, and they are preferably made separate from the pans, as shown best in Fig. 4, but inserted in short necks $o'$, projecting from and formed on the pans, and are coupled thereto acid-tight by a short rubber tube, $s$, or other suitable connection, as illustrated.

The covers $m$ of the pans are made of transparent glass, so that the action of the acid in the pans can be readily observed, and a glass tube, $k$, extends in an elbow form or bend from the center of each cover, and connects at a downward trend to a large lead pipe, $r$, which is arranged above the furnace and between the rows of pans, and extends at a downward inclination to the front of the furnace, where it delivers into a condensing-chamber, D, so that by these means all the vapors rising from the pans is intercepted by the covers $m\ m$, and conducted by the pipes $k\ k$ into the condenser-tube, where it is condensed, and is thence conveyed to the condensing-chamber D, from which it may be removed when required. Hence by the described construction each pan is independent, and is protected from exposure of its contents to the air, or from loss of acid vapors, which would cause waste or injurious effects if allowed to escape into the working-apartment, and yet the attendants can observe the action of each pan through its transparent cover, and thus have the entire apparatus under their eyes as thoroughly as if the pans were not covered. It will be also noted that by delivering the acid into each pan through the funnel or feed-tubes $o$, reaching to the bottom thereof, an effective movement or circulation is thus kept up in each pan while the evaporation is going on. This, therefore, prevents all stagnation which would be likely to cause deposits on the bottom of the pan, particularly if the acid contained sulphate of lead, which would be liable to accumulate in a crust on the center of the pan, and prevent the heat being conducted properly to the acid and endanger the cracking of the pan. By the means shown, however, any sulphate in the acid will be kept in motion and prevented from accumulating in any pan, but be diffused through the acid and be delivered with it from the last spout, thus preventing danger by its deposit in any pan.

An apparatus constructed as described with porcelain pans and glass covers will be quite inexpensive compared with the costly platinum stills, and will concentrate a large quantity of acid safely in a short time, which has been a great desideratum, as the great expense of platinum stills, costing many thousands of dollars, and the ease in which leakages are caused therein in case of the presence of particles of lead in the acid, has been a great objection to their use, and has called for an improved apparatus which will obviate these objections.

So far as the mechanical formation and arrangement of my apparatus is concerned, the pans B might be made of glass, platinum, or other suitable material; but I greatly prefer porcelain, as described, and consider it more desirable.

It is not absolutely necessary that the pans be arranged in steps one above the other, as they might be arranged on a level, with siphons between the pans to insure the flow from one to the other, as shown in Fig. 4 of my Patent No. 65,227, of 1867; but the terraced arrangement described is considered much preferable.

It is not absolutely necessary that the vapor or condenser pipe $p$ connect to a condensing-chamber, D, as this pipe $p$ may discharge idly in the air or elsewhere if it is not desired to save the vapors.

What I claim as my invention is—

1. In a concentrating apparatus, an evaporating-pan, B, made of porcelain, in combination with a cover, $m$, made of transparent glass, arranged and operating substantially as shown and described.

2. In a concentrating apparatus, the combination, with a furnace, A, having fire-chamber $a$ and flue or flues $b$, of the perforated top plates or tiles, $e$, porcelain pans $e'$, let into said tiles, and glass covers $m$ over said pans, arranged and operating substantially as shown and described.

JOHN HUGHES.

Witnesses:
   JNO. E. GAVIN,
   CHAS. M. HIGGINS.